April 23, 1946. C. NYGAARD 2,399,138
SCREW HOLDING ATTACHMENT FOR SCREW DRIVERS
Filed March 7, 1944

Inventor
Chris Nygaard
By Philip A. Diedell
Attorney

Patented Apr. 23, 1946

2,399,138

UNITED STATES PATENT OFFICE 2,399,138

SCREW HOLDING ATTACHMENT FOR SCREW DRIVERS

Christ Nygaard, Alameda, Calif.

Application March 7, 1944, Serial No. 525,415

2 Claims. (Cl. 145—52)

This invention, a screw holding attachment for screw drivers is designed to facilitate the driving of screws and simplify the locating thereof, align the screw, and function as a retriever for screws upon removal.

This invention will readily accommodate conventional flat head or round head screws, or even fillister head and other forms. It centers the screw head relative to the axis of the screw driver, grips the body of the screw below the head to axially align the screw with the screw driver, and automatically releases the screw as the screw is driven home. It readily grips a screw when the screw is being removed through a slight turn of a collar and holds the screw until it is to be released and is released by a simple retractive movement of the same collar.

The objects and advantages of the invention are as follows:

First, to provide an attachment for screw drivers which will align the axis of a screw with that of the screw driver.

Second, to provide an attachment which will center the head of the screw and grip the body of the screw immediately below the head to facilitate driving and locating of the screw.

Third, to provide an attachment which rotatably fits the shank of a screw driver so as to assure perfect axial alignment of the screw and screw driver.

Fourth, to provide an attachment as outlined which is easily adjusted for tension or pressure on the screw head independent of that of the bit.

Fifth, to provide an attachment for gripping screws which is caused to grip the screw by the slight turn of a collar.

Sixth, to provide an attachment for screw drivers for gripping and centering screws, which is simple in construction and economical to manufacture.

Other objects and advantages of the invention will become apparent as the following description is read on the drawing forming a part of this specification, and in which.

Figure 1:
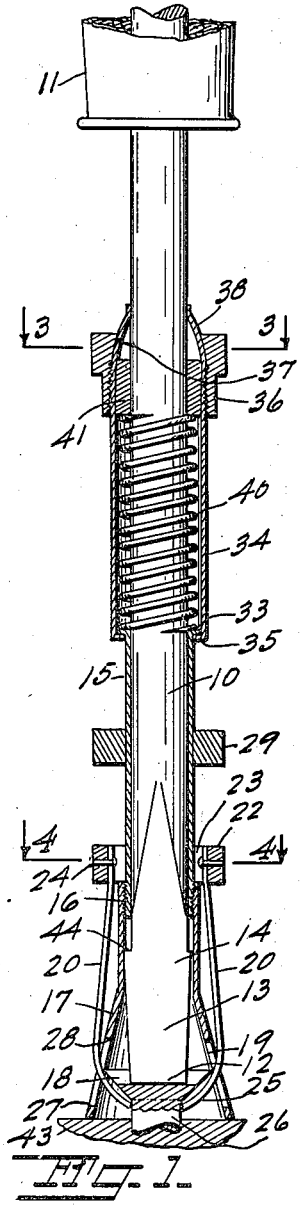
Fig. 1 is a sectional elevation of the invention shown applied to a screw driver, and showing a screw centered and held thereby as for driving or retrieving.

The invention can be applied to a screw driver with any cross-sectional form of shank, the shank 10 illustrated being cylindrical and having a handle 11, and with the bit 12 conventionally flared through flattening to a wedge shape as indicated at 13 to form the bit, which tends to make the diameter greater at the point 14, which obviously requires a different method of assembly than if the shank constituted the greatest diameter.

The invention consists of a sleeve 15 which is threaded at its lower end as indicated at 16. The screw head centering cup 17 is internally threaded at its upper end to fit the threaded end of the sleeve and is cone shaped to accommodate screw heads 18 of various diameters, and passages 19 are formed in equi-angularly spaced relation and extend almost to the bottom of the cone.

Equi-angularly spaced spring fingers 20 have one end connected together, preferably integral with or fixed to a collar 22 which is slidable on the sleeve 15; the fingers being shown as having one end secured in slots 23 formed interiorly of the collar and riveted in place as indicated at 24, though any other suitable method of securing the fingers can be used including that (not shown) of forming the fingers from one end of a flat band and curling the other end to fit the sleeve, or forming them from a sleeve which is slidable on the sleeve 15; the other ends of the fingers being bowed in as indicated at 25 to pass through the slots or passages 19 to grip the body 26 of a screw; the slots or passages 19 extending almost to the bottom of the cone as indicated at 27, and upwardly to a point 28 to clear the fingers for gripping the smallest sizes of screws to which the cone is adapted.

Figure 6:
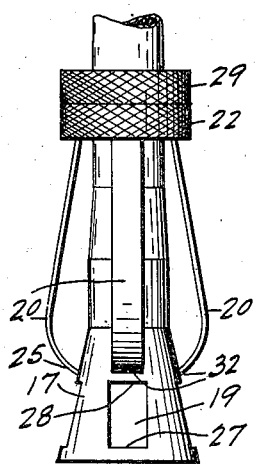
Fig. 6 is a fragmentary front elevation of the invention showing the gripping fingers retracted, and modified by having the cone an integral part of the sleeve.

A collar 29 is frictionally secured on the sleeve 15, a light press fit being suitable, and has a pin 30 with one end fixed therein and extending downwardly through one of the slots 23 in the collar 22, additional clearance as indicated at 31 being provided if necessary to allow suitable relative rotative adjustment of the collar 22, and collar 29 is axially located to act as a stop for collar 22 when the terminal ends 32 of the spring fingers are drawn out of the passages 19 and rest on the surface of the cone above the passages as indicated in Fig. 6. The upper end of the sleeve 15 is curled or flanged out as indicated at 33 to form a spring seat and a retainer for the spring barrel.

Figure 3:
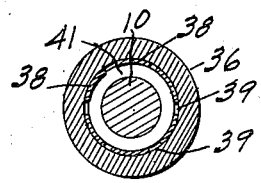
Fig. 3 is a section taken on line 3—3 of Fig. 1.
Figure 4:
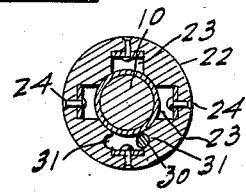
Fig. 4 is a section taken on line 4—4 of Fig. 1.

A spring barrel 34 has its lower end curled or flanged in as indicated at 35 with the flange slidable on the sleeve 15, and has the upper portion threaded to receive a nut 36 which is internally tapered at 37 to compress the fingers 38 formed by axially slitting the terminal end of the spring barrel, the slits being equi-angularly spaced as indicated at 39 in Fig. 3.

A compression spring 40 is located inside the spring barrel and surrounds the shank 10 of the screw driver, with one end urging against the flange 33 on the sleeve 15 and the other end being held by a collar 41 which in turn is retained by the partly compressed fingers 38.

With screw drivers in which no portion of the bit is any greater in diameter than the shank, the attachment can be slipped over the bit end. However, if the bit is any greater in diameter than the shank, it will be necessary to remove the handle 11 and slide the attachment over the handle end.

Figure 2:
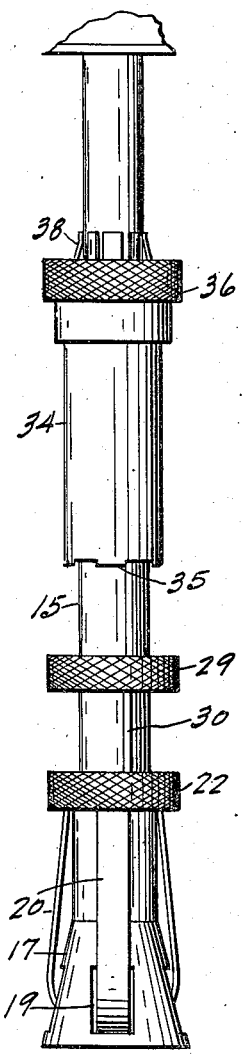
Fig. 2 is a front elevation of the invention.

In manufacturing the attachment the sleeve 15 is dropped into the spring barrel, the collar 29 is pushed or pressed onto the sleeve 15, followed by the collar 22 with its spring fingers, after which the cone is screwed onto the end of the sleeve. If the cone is made integral with sleeve 15, it will be necessary to assemble the collars from the other end before the upper end is flanged, and the lower end of the spring barrel will have to be flanged in after the two are assembled, the flanging being made easier by slotting the end to form fingers to be bent in as indicated at 35 in Fig. 2. Next the spring 40 is placed in the spring barrel, the collar 41 is pushed in above the spring, and the nut 36 is screwed on part way, just enough to lock the collar 41. The attachment is then ready to apply to any screw driver having a shank rotatably fitting the sleeve 15. When applied, the nut 36 is screwed down to compress the fingers about the shank sufficiently to require a fair degree of urgence to adjust the spring barrel axially along the shank. Such axial adjustment is conveniently made for the specific screw being used, the adjustment being preferably such that the bit of the screw driver will rest within the screw driver slot as indicated in Fig. 1 when the periphery of the screw head is in contact with the tapering walls of the cone, though the bit may be completely retracted to suit any screw.

Figure 5:
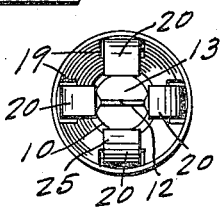
Fig. 5 is a bottom view of Fig. 1 with the screw removed and showing the screw driver bit.

In operation, the collar 22 with spring fingers is retracted to the position shown in Fig. 6 and is then turned until stopped by the pin 30 which brings the spring fingers between the passages 19. The collar 22 is then advanced as far as it will go with the ends of the fingers advanced to the position shown in Fig. 7. The cone is then placed over the screw as the screw is started or is being removed, or, the free screw is placed in the cone, and the collar 22 is turned back to its initial position, the fingers springing into the passages 19 to grip the screw as indicated in Figs. 1 and 5. The collar can then, if desired, be retracted slightly to engage the screw directly under the head.

In driving the screw, as the screw driver is turned, the spring barrel turns with it but remains in the relative axial position on the shank while the cone holds the screw in line. As the screw is driven the end of the cone eventually reaches the surface of the material 43 in which the screw is being driven and then remains stationary while the bit advances and the nut 36 and collar 41 compresses the spring 40 with the spring barrel lower end sliding down and rotating on the sleeve 15. Thus centering of the screw is continued until the screw is driven home, the spring fingers opening to release the head of the screw.

It will be noted that the pin 30 permits adjustment of the collar 22 and the spring fingers only from a position in which the fingers align with the passages 19 to a position between these passages and back again. The collar 29 is provided so that the sleeve 15 can be conveniently held against rotation by the hand while one finger of the same hand can be used to retract, turn, or advance the collar 22 for manipulation of the spring fingers.

Although four spring fingers are shown, three are usually considered the most satisfactory. The cone can be made to fit the specific size of screw for some standard job instead of being adaptable to various sizes. The cone can be adjusted so that it will not bear on the surface of the material to prevent marring by suitable adjustment of the spring barrel. Stop means is easily provided by forming a shoulder 44 on the flared portion of the screw driver, thus preventing any wedging of the sleeve 15 on the flared portion of the bit.

Figure 7:
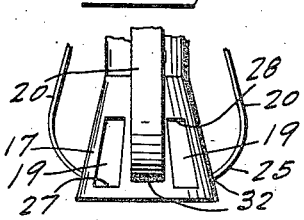
Fig. 7 is a fragmentary elevation taken at an angle of 45° from front and shows the gripping fingers advanced and ready for gripping the screw by slight turning of the gripping finger collar.

For retrieving screws, the collar 22 is retracted and turned to the neutral position in Fig. 7, the screw is unscrewed part way, then the collar 22 is turned back which causes the spring fingers to spring in through the passages and grip the screw which is then completely removed, the fingers holding the screw while it is being removed from a practically inaccessible position, and with overhead screws, preventing their loss.

I claim:

1. In an attachment having a spring-urged screw-head centering member slidable and rotatable on the shank of a screw driver, and having axially elongated slots formed through the walls of, and extending substantially to the lower end of said screw-head centering member; screw-head gripping and releasing means, comprising a movable collar slidable and rotatable on the screw-head centering member above said slots and having spring fingers inwardly bowed to project into said slots to grip a screw below the head; said movable collar being manually adjustable to four positions, respectively, for axially retracting the spring fingers out of the upper ends of the slots to release a screw head, rotatable to a position in which the spring fingers are in line with the spaces between said slots, axially advanceable with the spring fingers between the slots to a position in which the terminal ends of the spring fingers are in line with the lower ends of the slots ready for gripping a screw, and rotatable in a reverse direction for causing the spring fingers to snap into said slots to grip a screw located in the centering member; whereby a free screw may be held by said spring fingers for driving, or a driven screw secured when partly unscrewed and thereby retrieved from relatively inaccessible positions; and stop means fixed on the screw-head centering member for limiting rotative and axial movement of said movable collar to one-half the angular distance between said slots for alignment of said fingers with said slots in one position and intermediate said slots in the other position, and in and out of screw-head gripping position axially.

2. In an attachment having a spring-urged sleeve for the shank of a screw driver; screw gripping and releasing means comprising; a conical member secured to the lower end of the spring-urged sleeve and having axially elongated slots formed therein; a first collar slidable and rotatable on said sleeve and having inwardly bowed spring fingers to enter said slots; a stop collar fixed on said sleeve in spaced relation above said first collar when in advanced position to limit retractive movement of said first collar, said stop collar having a projection cooperating with said first collar for limiting rotative movement to one-half the angular distance between said slots for alignment of said fingers with said slots in one position, and intermediate said slots in the other position for moving said spring fingers into and out of screw head gripping position; the upper end of said conical member forming a stop to limit axial advance movement of said first collar.

CHRIST NYGAARD.